Patented Apr. 8, 1924.

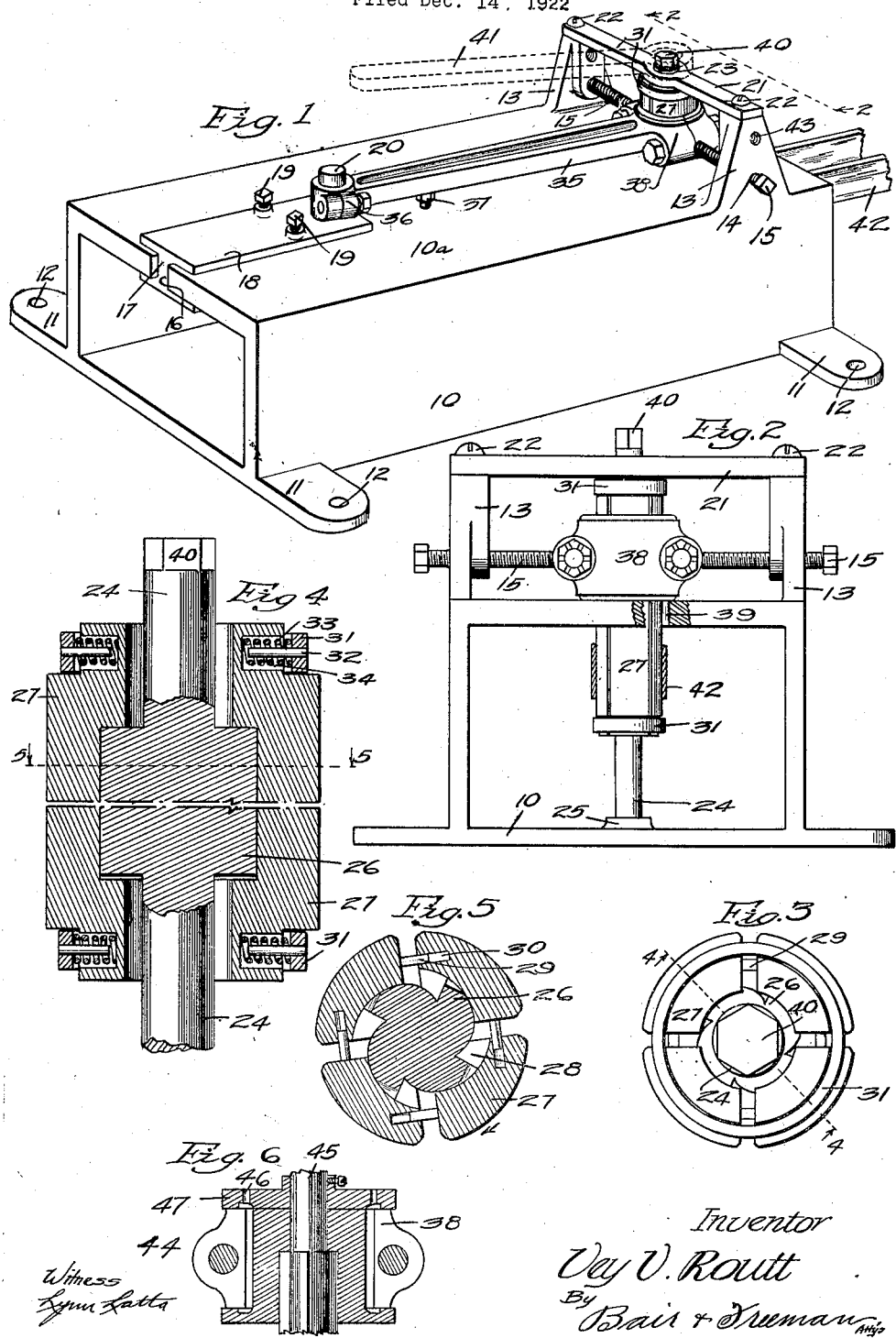

1,490,027

UNITED STATES PATENT OFFICE.

VEY V. ROUTT, OF DES MOINES, IOWA.

REBABBITTING AND BURNING-IN MACHINE.

Application filed December 14, 1922. Serial No. 606,972.

*To all whom it may concern:*

Be it known that I, VEY V. ROUTT, a citizen of the United States, and a resident of Des Moines, in the county of Polk and State of Iowa, have invented a certain new and useful Rebabbitting and Burning-In Machine, of which the following is a specification.

The object of my invention is to provide a machine of simple, durable and inexpensive construction for rebabbitting and burning in the bearings of connecting rods and the like.

A further object is to provide such a machine having an inner shaft and a sectional cylindrical shell enclosing said shaft, with means for driving the shell.

A further object is to provide such a machine, wherein the shell may be rotated for scraping or burning in the Babbitt metal on the inner surface of a bearing, and wherein the rotation of the inner shaft may be accelerated for expanding the shell thereon.

A further object is to provide a mold to be received on the inner shaft for pouring melted Babbitt metal into the bearing.

A further object is to provide such a machine having adjustable supporting and clamping means thereon for holding a connecting rod in position for rebabbitting.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of my improved burning in machine, the burning in apparatus being assembled, a connecting rod held in position for burning in, and a ratchet handle being inserted on the end of the inner shaft for expanding the shell.

Figure 2 is an end view of the machine, the drive belt being shown in section, taken on the line 2—2 of Figure 1.

Figure 3 is a plan view of the shaft with the shell thereon.

Figure 4 is a sectional view of the same taken on the line 4—4 of Figure 3.

Figure 5 is a sectional view of the same taken on the line 5—5 of Figure 4; and

Figure 6 is a sectional view of the mold used in the pouring of babbitt into the bearing.

It is well-known that the most efficient method of fitting the bearing of a connecting rod of an internal combustion engine to the crank shaft is by the process known as "burning in." This is ordinarily accomplished on the four cylinder motor vehicle engine by fitting the babbitt interior of the bearings to the crank shaft, so that the bearing fits very snugly, and rotating the crank shaft by some external source of power. The heat produced by the friction from the tightly fitting bearings will partially melt the babbitt until it is sufficiently plastic to assume the contour of the crank shaft.

However, considerable difficulty is encountered in burning in four bearings at once in that if one bearing is slightly tighter than the others, the babbitt in that bearing will heat much more rapidly than that in the remaining bearings and is liable to become burned. Again, it is practically impossible by that method to produce a bearing which is perfectly circular in its interior, owing to the unequal pressure of the crank shaft against its interior during the operation. A truly circular opening is desired because it prevents less friction to the crank shaft, even though the latter should itself be slightly distorted from a circular cross-section. But it has been found that the crank shaft very rarely becomes out of round, because of its greater hardness and also because there is less reason for it to wear unevenly, since the pressure against its face is continually shifting around the circumference.

I have therefore devised a machine which will operate upon one bearing at a time, in which the process may be watched very closely and the time for discontinuing the operation may be determined very accurately. By clamping the connecting rod in a rigid position with the bearing encircling and being subjected to the rotation of a cylindrical shell, and providing means for adjusting the position of the connecting rod until it is perpendicular to the axis of the shell, I obtain a perfectly circular opening, which is perpendicular to the axis of the connecting rod. By providing means for expanding the shell, I am able to obtain an opening of exactly the right diameter.

In the form of my invention shown herewith, I have designated by the numeral 10 a box-like base having a top 10ª. The base has laterally projecting feet 11 with openings 12, whereby the machine may be fastened to a work bench or table. At its forward end, the base 10 has two upwardly projecting ears 13. In the ears 13 are a pair of openings 14, which are threaded to receive the bolts 15. At the rear end of the top 10ª is a longitudinal slot 16 in which is slidably received a bar 17 in the shape of an I beam.

I will refer to the upper flanges by the numeral 18. In the flanges 18 are set screws 19, by which the bar 17 may be held in any of its adjusted positions. Projecting upwardly from the forward end of the bar 17 is a stub shaft 20, which may be of different diameters in order to fit connecting rods of different sizes, and removably threaded into the bar 17. (Not illustrated.)

Extending across from the top of one ear 13 to the other is a bar 21, which is removably fastened by screws 22. At its center is a circular opening 23, which forms a bearing for a vertical shaft 24. At its lower end, the shaft 24 is journalled in a bearing 25 in the base 10.

Extending along the central portion of the length of the shaft 24 are a plurality of lugs or cams 26, which in cross section assume the shape of teeth, which are cut on one side on a radius of the shaft and on the other side are inclined uniformly in the direction of rotation of the shaft from the highest portions of the cams to the surface of the shaft. (See Figure 5.)

A shell or casing encloses the shaft, extending from a point directly beneath the bar 21 to a point spaced upwardly from the base 10. This shell is composed of a number of sectors 27 corresponding to the cams 26 and having interior cam-shaped openings 28, which fit the cams 26, and are of substantially the same length. The sectors 27 are connected together by pins 29, which enter holes 30 in the opposite face of each adjacent section.

It will be seen that by rotating the shaft 24 with relation to the sectors 27, they will be moved toward or away from the center of the shaft 24. The sectors are so shaped that when in their closed position, they will form a circle in cross section.

The pins 29 will prevent the sectors 27 from moving circumferentially with respect to each other, except as they move on lines radial with the center of the shaft. In order to yieldingly hold the sectors in their closed positions normally, I provide at their ends encircling bands 31, having pins 32 extending into springs 33 received in holes 34 in the respective sectors.

The connecting rod 35 has its wrist pin bearing received over the stub 20 and that end of the rod is adjustable vertically by a screw bolt 37. The other end 38 of the rod rests on the base 10ª and is clamped by the screws 15. The shaft 24 with the shell in place is inserted through the bearing and through an opening 39 in the top 10ª into the bearing 25.

On the upper end of the shaft is a squared or hexagonal head 40, on which is inserted the handle 41 of a socket wrench in such a position as to allow the shaft to turn freely. A belt 42 is extended around the portion of the shell below the top 10ª, and communicates with some source of power to drive the shell. By turning the handle 41 forward faster than the shell is turning, the shell will be expanded.

In the operation of the machine, the mechanic holds the handle 41 with one hand and with the other a pair of calipers, which have been set to the diameter of the crank shaft. The jaws of the caliper are allowed to encircle the turning shell, while the mechanic slowly expands the sectors until the sectors touch the jaws, when the bearing will be the right size.

To hold a connecting rod of large size, the screws may be moved to the holes 43, above the holes 14. The plate 18 may be moved rearwardly to accommodate a longer rod.

In Figure 6, I have shown a mold which may be used in conjunction with the rest of my apparatus for pouring new Babbitt metal into a bearing. The mold 44 is mounted on a shaft 45, which may be mounted in the machine in the same manner as the shaft 24 and rotated while the hot metal is poured into the mold through holes 46 in a cap 47. In the figure, the bearing cap of the bearing 38 is shown encircling the mold, the cap screws being shown in section. It is found to be advantageous to so rotate the mold.

I have previously stated many of the advantages of my device, which may be summed up as follows:

The opening is made perpendicular to the connecting rod, it is made perfectly round, and no danger of burning the Babbitt metal is incurred. It requires less skill and knowledge to operate, and will do the work as rapidly as the old method.

Some changes may be made in the arrangement and construction of the various parts of my device, without departing from the essential features and purposes of my invention, and it is my intention to cover by my claims, any modified forms of structure or use of mechanical equivalents, which may be reasonably included within their scope.

I claim as my invention:

1. A burning in machine comprising a base, a shaft supported therein, a sectional shell encased on said shaft, means for clamping a bearing in the proper position encircling said shell, means for rotating said shell, and means for expanding said shell during its rotation.

2. A burning in machine comprising a base, a shaft supported therein, a sectional shell encased thereon, means for clamping a bearing in the proper position encircling said shell, means for rotating said shell, and means for expanding said shell during its rotation said means comprising cams on the shaft, corresponding depressions in the interior of the shell sections, and means for rotating said cams with relation to said sections.

3. A burning in machine including a base, a shaft removably journaled thereon, cams on said shaft, a sectional cylindrical shell encasing said cams, coacting cam surfaces on the interior of said shell, and means for yieldingly holding said shell in its closed position.

4. A burning in machine including a base, a shaft removably journaled thereon, cams on said shaft, a sectional cylindrical shell encasing said cams, coacting cam surfaces on the interior of said shell, means for yieldingly holding said shell in its closed position, and means for rotating said shell.

5. A burning in machine including a base, a shaft removably journaled thereon, cams on said shaft, a sectional cylindrical shell encasing said cams, coacting cam surfaces on the interior of said shell, means for yieldingly holding said shell in its closed position, means for rotating said shell, and means for accelerating the rotation of said shaft with relation to said shell.

6. A machine for rebabbitting and burning in connecting rods or the like, comprising a base, two aligned bearings thereon, one of said bearings being removable, a mold shaft to be supported in said bearings and rotated, a mold on said shaft, set screws for adjustably clamping the bearings of a connecting rod in place around the mold, an adjustable tail stub for holding the rear end of the connecting rod, and a screw for adjusting the connecting rod in a direction parallel to the axes of its bearings.

7. A burning in machine comprising a base, two aligned bearings thereon, one of said bearings being removable, a shaft journaled in said bearings, cams on said shaft, a sectional shell enclosing said cams, means for rotating said shell, means for rotating said shaft at a faster rate of speed than the rotation of said shell, whereby the shell may be expanded, adjustable clamp screws for holding a connecting rod in place encircling said shell, and adjustable means for holding the wrist pin end of the connecting rod.

Des Moines, Iowa, November 28, 1921.

VEY V. ROUTT.